Sept. 19, 1944.  H. F. PEAVEY  2,358,414
STERILIZER AND SEDIMENTIZER
Filed July 5, 1941

INVENTOR
HAROLD F. PEAVEY
BY
Charles A. Warren
ATTORNEY

Patented Sept. 19, 1944

2,358,414

UNITED STATES PATENT OFFICE 2,358,414

STERILIZER AND SEDIMENTIZER

Harold F. Peavey, Springfield, Mass., assignor to Leon J. Barrett, Worcester, Mass.

Application July 5, 1941, Serial No. 401,231

6 Claims. (Cl. 210—52.5)

The present invention relates to a device adapted for sterilizing fluids, particularly viscous fluids, and for simultaneously causing the precipitation of sediment within the fluid. The device is primarily intended for the treatment of cutting oil.

In prior devices of this character, the oil is subjected to sterilization by heating and sediment is precipitated in a separate settling tank independent of the sterilizer. The principal object of the present invention is to provide for the simultaneous sterilization and sedimentation of the fluid so that when the sterilizing is completed the fluid will have been completely freed from any foreign particles.

Where the oil or other fluid, viscous in character, is subjected to heat for sterilization, the viscosity of the fluid is reduced as the temperature of the fluid is raised, so that the sediment in the oil may be readily precipitated while the oil is in the sterilizer and at the high temperature. During the heating of the oil, however, when a disk-like heating element is used, the convective currents set up extend entirely across the area of the tank and do not permit the particles of sedimentary material to pass downwardly through the heating coil and into the bottom of the tank. A further feature of the invention resides in providing a heating element having the necessary area for rapid heating, but at the same time leaving a substantial area of the tank free from heating coils so that a downward flow of oil unimpeded by heating coils may take place during the heating of the oil. In this way sediment may be deposited out during the heating of the oil as well as after the heating has been discontinued.

Other and further objects and advantages of the invention will hereinafter more fully appear from the following description taken in connection with the accompanying drawing, in which—

Figure 1:
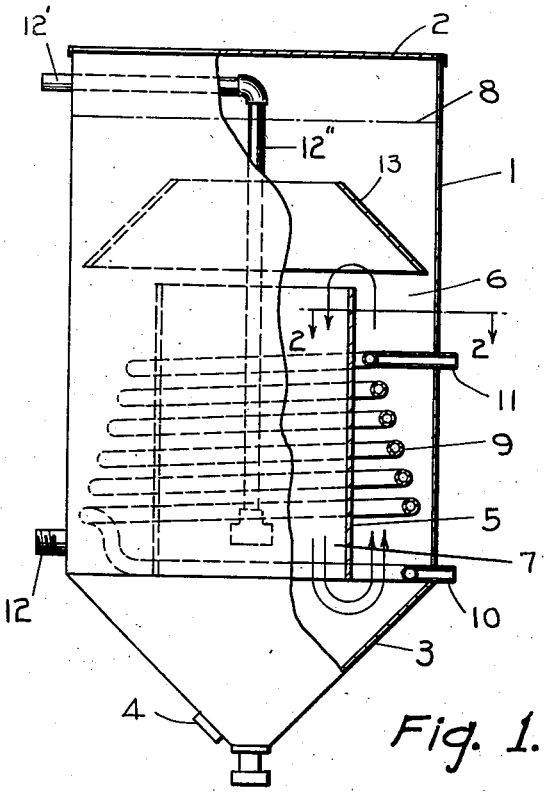
Fig. 1 is a side elevation, with parts broken away, of a sterilizer embodying the invention.
Figure 2:
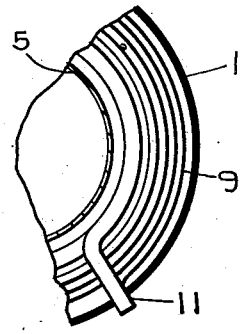
Fig. 2 is a fragmentary sectional view along the line 2—2 of Fig. 1.

Referring first to Figs. 1 and 2, the combined sterilizer and sedimentizer comprises a tank 1, preferably cylindrical, the upper end of which is closed by a cover 2, that may be removed for cleaning or inspection of the inside of the tank. The bottom wall 3 of the tank is conical, as shown, to form a receptacle in which the sediment from the oil or other fluid within the tank is collected, a drain spout 4 being provided adjacent the lowermost tip of the cone for the removal of the sedimentary material.

Positioned within the tank is a cylindrical baffle 5 extending vertically to define an outer compartment 6 and an inner compartment 7. The upper end of the baffle is spaced from the cover 2 and is located below the normal oil level 8 when the tank is full. The lower end of the baffle is spaced a substantial distance from the conical bottom 3 of the tank to provide for a circulation of the fluid from one compartment to the other.

Positioned in one of the compartments for the purpose of heating the fluid in the tank is a heating coil 9, this coil being located in the outer compartment in the particular arrangement shown, and comprising a spirally coiled pipe into which steam may be introduced. It will be noted that the successive coils of the heating element are spaced apart vertically to form a frustro-conical element so that the movement of oil past the separate coils is not materially impeded. It will be apparent that the space between adjoining coils is greater when they are spaced apart vertically than if they were all in the same horizontal plane.

Suitable inlet and outlet ports 10 and 11 are provided for the delivery of steam to the heating element. A suitable port 12 is provided for the drainage of the sterilized and sedimentized oil, and a port 12' at the top of the tank is used for filling the tank as by a pump connected thereto. The port 12' preferably has connected thereto a pipe 12" extending downwardly centrally of the tank to a point adjacent the bottom thereof. In this way discharge of oil is directed to a point near the bottom of the tank and any impurities will tend to remain at or below this level.

The cross-sectional areas of the two compartments 6 and 7 are preferably approximately the same, allowing for the area of the heating coil. Under the influence of the heating coil the oil heated thereby tends to rise in the compartment 6, and at the top of this compartment the oil flow is directed inwardly by a frustro-conical baffle 13, so that, as indicated by the arrows, the oil flows downwardly through the compartment 7. At the lower end of the baffle 5 the direction of flow of the oil is reversed, as indicated, and the oil moves upwardly over the heating coils. These convective currents which are set up under the heating action are comparatively slow and therefore do not tend to stir up any of the sediment collecting on the cone or bottom wall 3. The circulation of the fluid assures a uniform heating of the entire body of fluid.

The sediment, part of which settles by gravity, is also precipitated when the direction of the flow of fluid is reversed at the lower portion of the tank. The tendency of the particles is to continue to move in a straight line rather than to be turned and caused to move upwardly with the fluid, and this action, although mild in character, assists in the removal of all sedimentary particles from the fluid. Obviously, the lower end of the baffle 5 is spaced from the bottom wall a distance sufficiently to permit oil to flow around the end of the baffle without establishing any currents so close to the bottom wall 3 as to stir up any sediment deposited.

Figure 3:
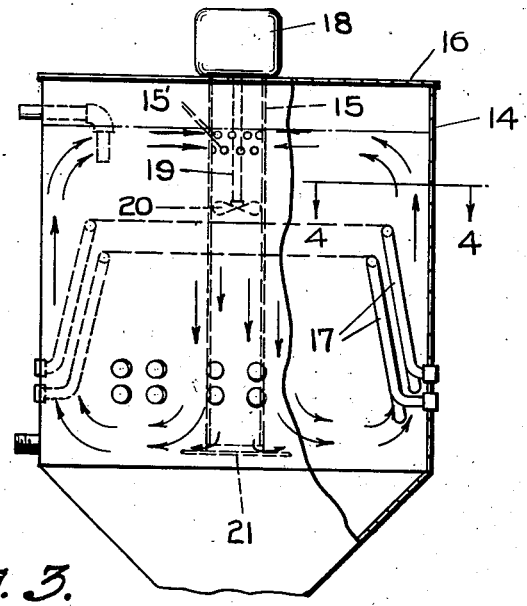
Fig. 3 is a side elevation, with parts broken away, showing a modification.
Figure 4:
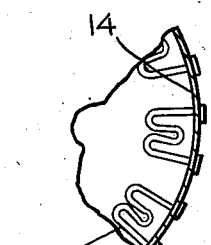
Fig. 4 is a fragmentary sectional view along the line 4—4 of Fig. 3.

Referring now to Figs. 3 and 4, the tank 14 has a small diameter cylindrical baffle 15 centrally of the tank and extending from the cover 16 to a point approximately on the level of the lower edge of the cylindrical side wall 14' of the tank. In this modification, heating is provided by one or more series of electrical heating elements 17, Fig. 4, each series being suitably positioned within the tank, as shown in Fig. 4, to form a frustro-conical heating surface. The positioning of the heating elements slantwise rather than in a horizontal plane permits a larger heating area in comparison to the cross-sectional area of the compartment in which the heating element is positioned and also impedes the flow of oil past the element as little as possible. This structure is useful where the shop in which the sterilizer is installed does not have a continuous supply of steam under pressure. The baffle 15 has a series of openings 15' therein below the normal level of fluid in the tank to provide for flow from one side thereof to the other. Thus the baffle is effective in directing the flow of fluid in a predetermined path.

In certain installations it may be desirable to circulate the fluid positively rather than to rely upon the convective currents established by the heating action. In this event, as shown in Fig. 3, a suitable slow speed motor 18 is mounted on the cover 16 and has a downwardly extending shaft 19 on the lower end of which is carried a propeller 20. The propeller is positioned inside of the baffle 15, and the rotation of the propeller aids in causing a flow of fluid downwardly inside of the baffle 15 and upwardly over the coil 17. The baffle 15 with the series of lateral openings 21 therein through which fluid flows to be directed downwardly by the propeller, permits a circulating action to prevent overheating of the fluid in contact with the heating elements, which, especially when electrical, have a relatively high temperature. It will be noted that a plate 21 below the lower end of the baffle 15 directs the fluid laterally and prevents currents set up by the circulation of the fluid from stirring up the sediment in the bottom of the tank.

I claim:

1. Apparatus for the treatment of fluids, comprising in combination a tank, a substantially annular heating element within the tank, a cylindrical baffle positioned vertically inside of the heating element, and completely submerged by fluid in said tank, said baffle being spaced from the top and bottom of the tank to provide for a circulation of the fluid around said baffle, and a completely submerged conical baffle above and spaced from the end of the cylindrical baffle to direct fluid from one side of the cylindrical baffle to the other.

2. Apparatus for the treatment of fluids, comprising in combination a tank, a frustro-conical heating element within the tank adjacent the lower end thereof and a tubular baffle positioned vertically within the heating element, and completely submerged by fluid in said tank, to define an inner and outer chamber within the tank, the ends of said baffle being substantially spaced from the top and bottom walls of the tank.

3. Apparatus for the treatment of fluids, comprising in combination a tank, a substantially vertical baffle completely submerged by fluid in said tank and dividing the tank into separate compartments, the ends of the baffle being spaced from the top and bottom of the tank to provide for flow of fluid from one compartment to the other, and a heating element positioned in one of the compartments, said heating element causing the continuous flow of convective currents in the fluid in the tank with said currents flowing upwardly in the compartment in which the heating element is located and downwardly in the other compartment.

4. Apparatus for the treatment of fluids, comprising in combination a tank, a substantially vertical baffle completely submerged by fluid in the tank and dividing the tank into separate compartments, the ends of the baffle being spaced from the top and bottom of the tank to provide for flow of fluid from one compartment to the other, and a heating element positioned in one of the compartments, the bottom of the tank being spaced substantially below the lower edge of the baffle to provide a space for the collection of impurities out of the path of the convective currents established in the fluid when heated by said element.

5. Apparatus for the treatment of fluids, comprising in combination a tank provided a substantially conical bottom wall, a heating element extending upwardly above said bottom wall and providing portions at different radial distances from the longitudinal axis of said tank, and a cylindrical baffle extending vertically of the tank within said heating element, and completely submerged by fluid in said tank, said baffle being spaced above said bottom wall at its lower end and providing for the flow of fluid into its upper end above said heating element, as a result of convective currents established in the fluid due to the heating thereof.

6. An improved method for the treatment of viscous fluid to remove sedimentary material, which consists in confining a substantially cylindrical body of fluid to be treated, subjecting said fluid body to heat distributed along the axis of said body and at varying radial distances therefrom to set up oppositely flowing convective currents in said body parallel to its axis, and positively dividing said currents, entirely within said body, into an outer upwardly flowing stream, along said zone of heat distribution and an inner downwardly flowing stream entirely separated from the said outer stream.

HAROLD F. PEAVEY.